United States Patent

Hicke et al.

[11] Patent Number: 6,159,370
[45] Date of Patent: Dec. 12, 2000

[54] SOLVENT AND ACID RESISTANT MEMBRANE ON THE BASIS OF POLYACRYLNITRILE (PAN) AND A COMONOMER COPOLYMERIZED THEREWITH AND A METHOD OF MANUFACTURING SUCH A MEMBRANE

[75] Inventors: Hans-Georg Hicke; Ingeburg Lehmann; Margot Becker, all of Teltow; Mathias Ulbricht, Berlin; Günter Malsch, Teltow; Dieter Paul, Kleinmanchnow, all of Germany

[73] Assignee: GKSS Forschungszentrum Geesthacht GmbH, Geesthacht, Germany

[21] Appl. No.: 09/265,302

[22] Filed: Mar. 9, 1999

[30] Foreign Application Priority Data

Mar. 19, 1998 [DE] Germany ............................ 198 11 997

[51] Int. Cl.⁷ .................................................. B01D 71/42
[52] U.S. Cl. ............................... 210/500.43; 210/500.35; 210/500.23; 210/490; 264/41; 264/48; 264/49; 427/245
[58] Field of Search ........................ 210/500.27, 500.35, 210/500.43, 490; 264/41, 48, 49; 427/245

[56] References Cited

U.S. PATENT DOCUMENTS

| 4,025,439 | 5/1977 | Kamada et al. | 210/500.43 |
| 4,107,049 | 8/1978 | Sano et al. | 210/490 |
| 4,177,150 | 12/1979 | Inoue et al. | 210/490 |
| 4,511,711 | 4/1985 | Shimomura et al. | 210/500.43 |
| 4,906,379 | 3/1990 | Hodgins et al. | 210/638 |
| 5,039,421 | 8/1991 | Linder et al. | 210/500.43 |
| 5,554,292 | 9/1996 | Maeda et al. | 210/640 |
| 5,707,522 | 1/1998 | Maeda et al. | 210/500.23 |

FOREIGN PATENT DOCUMENTS

| 2649543 | 5/1977 | Germany . |
| 7404181 | 10/1974 | Netherlands . |
| 2033830 | 5/1980 | United Kingdom . |
| 2037222 | 7/1980 | United Kingdom . |

*Primary Examiner*—Ana Fortuna
*Attorney, Agent, or Firm*—Klaus J. Bach

[57] ABSTRACT

In a method of making solvent and acid resistant membrane on the basis of polyacrylnitrile (PAN) and a comonomer copolymerized therewith wherein the membrane is formed from a solution by phase inversion, glycidylmethacrylate is used as the comonomer and the membrane formed thereby is then subjected to ammonia.

10 Claims, No Drawings

SOLVENT AND ACID RESISTANT MEMBRANE ON THE BASIS OF POLYACRYLNITRILE (PAN) AND A COMONOMER COPOLYMERIZED THEREWITH AND A METHOD OF MANUFACTURING SUCH A MEMBRANE

BACKGROUND OF THE INVENTION

The invention relates to a solvent and acid resistant membrane on the basis of polyacrylonitrile (PAN) and a comonomer copolymerized therewith, wherein the membrane is formed from the solution by phase inversion in water and also to a method of manufacturing the membrane.

In continuous processes using catalysts, such active compounds which, initiate strong interaction forces, are often immobilized on carrier materials such as membranes. This will be explained below in greater detail on the basis of the immobilization of enzymes.

Such an immobilization is appropriate and desired if:
1. The pH value changes drastically during the reaction and the reaction products formed can be rapidly removed from the ambient of the enzyme.
2. The products formed in the medium employed, for example in the aqueous medium, need to be transferred constantly to another solvent, for example, an organic solvent in order to insure operation of the continuous process.
3. The product and enzyme molecules have similar hydrodynamic diameters and therefore cannot be separated continuously by the separation processes usually employed.

If the enzymatic process is influenced furthermore with regard to a particular product composition while observing the process parameters mentioned above, then this is only possible if the reactors generally used (V>100 ml) are reduced in sizes by an order of magnitude.

The pores of the membranes (V~1 $\mu$l) can be considered to be microreactors in which the enzymes desired for performing the process can be covalently immobilized. For a well defined process procedure, the substrates can then be brought, by convention, close to the enzyme molecules immobilized in the pores. The micro-environment for the enzyme molecules can easily be controlled in this way by sensitive reactions.

With such membranes, the desired continuous process requires that a gradual development of bacteria in the whole reaction system is prevented. Membranes suitable for such a continuous process have been sterilized so far mainly by exposure to ethylene oxide gas, by treatment with secondary plasma or by various chemical disinfectants (PDI, Handbook Series: The Effect of Sterilization Methods on Plastics and Elastomers, Rapra Technology Ltd, Shawbury, Shrewsbury, Shropshire SY4 4NR UK 1994).

Particularly in the medical field, it is generally required that, for materials which may end up in the human body, no sterilization processes are used which may result in chemical alterations of the goods to be treated. Such a result, however, cannot be guaranteed with irradiation processes presently in use and, of course, not with chemical disinfections. With an exposure to ethylene oxide, there is the risk that, after the sterilization procedure, the gas cannot be fully removed.

Besides these well known sterilization processes which however include some risks, the hot steam sterilization in an autoclave is the safest method. All glass and hose materials and all metal parts can be sterilized in this way without problems. The superheated steam sterilization can furthermore be used universally with available apparatus and is therefore the most favored procedure. However, superheated steam sterilization detrimentally affects the membranes available so far. This is particularly true for membranes with reactive groups on their surfaces, which are present for the covalent bonding of enzyme molecules. Such membranes lose their reactivity during superheated steam sterilization.

It is the object of the present invention to provide a solvent-, acid- and heat-resistant membrane on which particularly catalysts can be immobilized.

SUMMARY OF THE INVENTION

In a method of making a solvent and acid resistant membrane on the basis of polyacrylonitrile (PAN) and a comonomer copolymerized therewith wherein the membrane is formed from a solution by phase inversion in known manner, glycidylmethacrylate is used as the comonomer and the membrane formed thereby is then subjected to ammonia.

The solvent and acid resistant membrane according to the invention includes a particular acrylonitrile copolymer, which, itself, is known. This copolymer is dissolved in a solvent, that is, dimethylformamide. From the solution so obtained, the membrane is formed in a known procedure using the phase inversion in water or in an aqueous solution.

In the membrane according to the invention, glycidylmethacrylate (methacrylacid glycidylester) is used as the copolymer. Consequently, the membrane according to the invention is formed from an acrylonitrile-glycidylmethacrylate copolymer. The functional group density for the later enzyme-bonding, which will be described later can be adjusted for the respective membranes by different glycidylomethacrylate (GMA) content of the poly acrylonitrile-co-glycidylmethacrylate (PANGMA).

For the poly-(AN-co-GMA) solution copolymerisates, which were produced in a radically initiated manner either with ammonium peroxyldisulfate (APS) or 2,2 azoisobutyronitrile (AlBN) in dimethylformamide, the installation rate of the GMA reaction sequence integrated statistically into the membrane-polymer in the concentration range of $C_{GMA}$=1 to 49 Mol %, corresponding to a molar content in the monomer mixture of 0.1 to 25 Mol %.

To insure the membrane forming behavior of the reaction copolymers, the [monomer]/[initiator] concentration ratio is balanced by a basic temperature control ($T_{APS}$=50° C., $T_{AlBN}$=60° C.) in such a way that the kinetically controllable mole mass of the products formed has an average value of Mn>40 KD(kg/mole). Since in accordance with the copolymerization parameter r of the monomer pair ($r_{AN}$=0.14, $r_{GMA}$=1.32) GMA is incorporated in the copolymer to a greater degree and, consequently, depleted in the monomer mixture, the conversions of the chemical inhomogenization as a function of the duration ($t_{APS}$≦6 h, $t_{AlBN}$≦18h) is limited to V≦30%.

For the manufacture of the membranes casting solution (20 mass % polymer solid material), the polymer powder (preferably APS-initiated product) obtained by precipitating/drying, but at times also directly the de-monomerized/concentrated polymerization solution (preferably an AlBN-initiated product) was used.

The glycidylmethacrylate part as co-monomer-sequence represents preferably 1 to 49 mol %, especially 1 to 15 mol % of the PAN copolymer. If a range of 1 to 49 mol % or 1 to 15 mol % is referred to here, all the intermediate values, particularly whole number values are included and meant to be disclosed such as 1, 2, 3 . . . 11, 12, 13–18, 19, 20, . . . 28, 29, 30 . . . 28,29,40, . . . 45, 46, 47 and 48.

After the phase inversion procedure, by way of which the membrane according to the invention is obtained, a different permeability can be obtained from the acrylonitrile-glycidylomethacrylate-copolymer solution, especially by changing the casting solution concentration, the precipitation bath composition and the precipitation bath temperature.

After the formation of the membrane, the membrane is treated with ammonia either by gaseous ammonia or in a bath including preferably an aqueous ammonia solution.

One of the essential aspects of the membrane according to the invention is seen in the fact that the epoxy groups available are aminized. The primary amino groups formed thereby then cross-link surprisingly—inspite of a large ammonia excess—with neighboring epoxy groups while forming secondary or, respectively tertiary amino groups. As a result, the membrane according to the invention becomes insoluble with respect to polar and non-polar solvents and also resistant to strong acids.

The membrane obtained in this manner can also be subjected to the high temperatures of an autoclave. In a preferred embodiment, the membrane is therefore autoclave-treated after being subjected to the ammonia treatment. The permeability of the membrane according to the invention is decreased by such treatment to a lesser degree, the greater the polymerization degree is.

Surprisingly, the membrane according to the invention can be dried in air without the precautions normally needed. The air drying is done normally after the autoclave treatment, but it can also be done before that treatment.

By adjustment of the concentration, the temperature and the reaction time, the concentration of amino groups and the degree of polymerization as well as the residual epoxide content can be fine-adjusted during post treatment with ammonia so as to have the proper values for the further treatment of the membrane. The membrane may additionally, after treatment in the autoclave, be dried in a form-stable manner without admixture of additives and without an expensive solvent exchange.

The membrane according to the invention can be used as acid resistant ultra-filtration membrane; it is compaction stable and is suitable for the separation of compounds dissolved in organic solvents.

In accordance with a preferred embodiment effective substances are immobilized on, or bonded to, the surface of the membrane according to the invention. Such effective substances are for example catalysts. These effective substances or catalysts may be any type capable to influence or facilitate chemical or biochemical processes by absorption and desorption on substrates. These effective substances or catalysts are preferably enzymes which are covalently bonded to still available epoxy groups and/or aldehyde groups which, after activation with glutordialdehyde, were formed from the first formed amino groups.

With the membranes according to the invention carrying enzymes, enzymatic reactions can be performed in organic solvents, for example DMF, using membranes with suitable substrates and enzymes.

By different glycidylomethacrylate contents and different reaction times with ammonia during post treatment, the membranes according to the invention may, in addition to being solvent and acid resistant, become bi-functional by the epoxy groups which have not been converted. The bi-functional membranes so obtained can be used for additional coupling with other agents.

The membrane according to the invention may be a flat membrane or a hollow fiber membrane.

The present invention provides therefore for a solvent and acid-resistant air dried reactive membrane, which can be used for the ultrafiltration of compounds dissolved in organic solvents and furthermore for the coupling of substances with chemical or biological functionality. The pores of these membranes according to the invention act like micro-reactors. The chemical functionality and pore morphology are not changed by thermal sterilization. The reaction membrane according to the invention is consequently solvent resistant and can be subjected to autoclave treatment and to drying without losing the capability to covalently bond and effective substances, particularly enzymes.

Preferred embodiments of the invention will be described below on the basis of examples.

EXAMPLES 1

For the manufacture of membranes according to the invention, as a polymer poly(acrylnitrile-co-glycidymethacrylate) PANGMA with 8.1 mol % glycidymethacrylate (GMA) was provided; the mole mass M (based on PAN) was 55,000.

The base membrane was made from about 19.5% PANGMA-solution in DMF on a fleece (Hilstar 100) by phase inversion. The obtained result was as follows:

Membrane 1: $J_w$=5039 l/hm$^2$ bar

Membrane 2: $J_w$=4172 l/hm$^2$ bar

The membranes were post-treated for 22 hrs at 45° C. in 25% ammonia solution, washed with water (neutral) and heat-treated in an autoclave at 121° C. for 30 minutes.

The data of the membranes before and after autoclave treatment were as follows

|  | Before Autoclave Treatment | After Autoclave Treatment |
| --- | --- | --- |
| Membrane 1 | 2342 Jwl/hm$^2$ bar | 1669 Jwl/hm$^2$ bar |
| Membrane 2 | 2150 Jwl/hm$^2$ bar | 1495 Jwl/hm$^2$ bar |

EXAMPLE 2

Membranes according to invention were made for the enzyme immobilization.

The membrane data for aminized membranes (100% ammonolysis, no epoxy groups detectable) are as follows:

Membrane 3: $J_w$=3980 l/hm$^2$ bar

Membrane 4: $J_w$=3595 l/hm$^2$ bar

The membrane characteristics for aminized and autoclaved membranes are as follows:

Membrane 3: $J_w$=1348 l/hm$^2$ bar

Membrane 4: $J_w$=1557 l/hm$^2$bar

After activation with glutaraldehyde, amyloglucosidase was immobilized on the aminized and autoclaved membranes (condition: 10% glutaraldehyde solution; amyloglucosidase 0.5% in phosphate buffer, pH=7).

The following membrane characteristics were obtained:

Membrane 3: $J_w$=995 l/hm$^2$ bar

Enzyme activity EA=304 mU/cm$^2$

Membrane 4: $J_w$=1220 l/hm$^2$ bore

Enzyme activity EA=365 mU/m$^2$

For the purpose of comparison additional aminized and autoclaved membranes were prepared and amyloglucosidase was immobilized on these membranes without preceding activation with glutaraldehyde:

Aminized membranes (100% ammonolysis, no epoxy groups present)

Membrane 5: $J_w$=3550 1/hm² bar

Membrane 6: $J_w$=4236 1/hm² bar

Aminized and autoclaved membranes:

Membrane 5: $J_w$=1680 1/hm² bar

Membrane 6: $J_w$=1845 1/hm² bar

Membranes after enzyme immobilization:

Conditions: amyloclucosidase 0.5% in phosphate buffer pH=7

Membrane 5: $J_w$=1284 1/m² bar

Enzyme activity EA=15 mU/cm²

Membrane 6: $J_w$=1348 1/hm² bar

Enzyme activity EA=15 mU/cm²

EXAMPLE 3

PANGMA membranes (with 13 mol % GMA) were subjected to a 100% ammonolysis, washed with water neutral and dried. The membranes were treated at room temperature (20° C.) for about 20 hrs with various, particularly very polar, solvents. The solubility was determined gravimetrically. It was found that the membranes were insoluble in acetone, DMF, DMSO, hexafluorisopropanol, hexamethylphosphoracidtriamide, n-methyl-pyrrolidon (NMP) and THF.

EXAMPLE 4

Like in example 1, the same PANGMA membranes (with 8.1 mol % GMA) were post-treated with ammonia and then autoclaved. With these membranes, a polystyrene solution dissolved in the DMF was ultrafiltered.

The solution contained 0.1 g polystyrene (FERAK) in 100 ml DMF.

$J_{DMF}$ (after ammonolysis): 163 1/hm²bar $J_{DMF}$ (after autoclaving): 108 1/hm² bar $J_{PS/DMF}$—solution (after autoclaving): 21 1/hm² bar Retained for polystyrene: 91% (measured with GPC).

What is claimed is:

1. A solvent and acid resistant membrane on the basis of poly acrylonitrile (PAN) and a comonomer copolymerized therewith generated from a solution by phase inversion, said comonomer being glycidylmethacrylate and the membrane provided thereby being subjected to heat treatment in an autoclave in the presence of ammonia thereby forming amino groups.

2. A membrane according to claim 1, wherein said membrane is air dried.

3. A membrane according to claim 1, wherein, after activation with an activation reactant enzymes, are immobilized on, or bonded to, said membrane.

4. A membrane according to claim 3, wherein, after activation with glutaraldehyde, said enzymes are covalently bonded to available epoxy groups which are formed from said amino groups.

5. A membrane according to claim 1, wherein said membrane is in the form of a flat membrane or in the form of a hollow fiber membrane.

6. A method of manufacturing a solvent resistant membrane, comprising the step of: copolymerizing an acrylonitrile with a glycidylmethacrylate comonomer, forming said membrane by phase inversion and heat-treating the membrane in an autoclave in the presence of ammonia thereby forming amino groups.

7. A method according to claim 6, wherein said membrane is air dried before or after the autoclave treatment.

8. A method according to claim 6, wherein said membrane is activated with an activation agent and enzymes are immobilized on, or bonded to, said membrane.

9. A method according to claim 8, wherein, after activation with glutaraldehyde, said enzymes are covalently bonded to available epoxy groups which are formed from amino groups.

10. A method according to claim 6, wherein said membrane is made in the form of a flat membrane or in the form of a hollow fiber membrane.

* * * * *